(12) United States Patent
Eckert et al.

(10) Patent No.: US 6,276,199 B1
(45) Date of Patent: Aug. 21, 2001

(54) METHOD FOR PRODUCING FILLING LEVEL MEASURING DEVICE OPERATING WITH MICROWAVES

(75) Inventors: Manfred Eckert, Todtnau; Klaus-Peter Oberle, Weilheim, both of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/614,082

(22) Filed: Jul. 11, 2000

Related U.S. Application Data

(63) Continuation of application No. 08/926,062, filed on Sep. 9, 1997.
(60) Provisional application No. 60/030,478, filed on Nov. 13, 1996.

(30) Foreign Application Priority Data

Oct. 4, 1996 (DE) .................................. 196 41 036
Jun. 6, 1997 (EP) .................................. 97109196

(51) Int. Cl.$^7$ .............................. G01F 23/28; H01Q 1/10
(52) U.S. Cl. ................. 73/290 V; 343/872; 343/888; 343/900
(58) Field of Search .................. 73/290 R, 290 B, 73/290 V; 343/753, 888, 900, 785, 715, 872, 873, 896

(56) References Cited

U.S. PATENT DOCUMENTS

| | | |
|---|---|---|
| 3,128,467 | 4/1964 | Lanctot . |
| 3,852,757 | 12/1974 | Kaiser ................................. 343/900 |
| 3,977,005 | 8/1976 | Cejka ................................. 343/702 |
| 4,490,727 | * 12/1984 | Kowols ................................. 343/895 |
| 4,560,002 | 12/1985 | Davis, Jr. et al. ................... 166/252 |
| 4,566,321 | 1/1986 | Zacchio ............................. 73/290 R |
| 4,956,647 | 9/1990 | Kimura ................................ 343/901 |
| 5,070,730 | 12/1991 | Edvarsson ......................... 73/290 V |
| 5,136,299 | 8/1992 | Edvarsson ............................ 342/124 |
| 5,248,987 | 9/1993 | Lee ....................................... 343/785 |
| 5,252,984 | * 10/1993 | Dorrie et al. ........................ 343/900 |
| 5,642,121 | 6/1997 | Martek et al. ........................ 343/786 |
| 5,877,663 | 3/1999 | Palan et al. .......................... 333/252 |
| 5,907,309 | 5/1999 | Anderson et al. .................... 343/786 |

FOREIGN PATENT DOCUMENTS

| | | |
|---|---|---|
| 30 36 611 A1 | 9/1980 | (DE) . |
| 44 05 855 A1 | 2/1994 | (DE) . |
| 94 12 243.1 | 7/1994 | (DE) . |
| 44 43 055 | 12/1994 | (DE) . |
| 195 10 484 A1 | 3/1995 | (DE) . |
| 94 12 243 U1 | 3/1995 | (DE) . |
| 196 17 963 A | 11/1997 | (DE) . |
| 2 188 784 A | 10/1987 | (GB) . |
| 56032806 | * 4/1981 | (JP) ....................................... 343/785 |
| 0022922 | 2/1983 | (JP) .................................... 73/290 R |

OTHER PUBLICATIONS

K.K.S. Jamwal et al., "Impedance Characteristics of Polymer Circular & Rectangular Antennas Operated in X–Band," Indian Journal of Radio & Space Physics, vol. 10, Oct. 1981, pp. 182–185.

* cited by examiner

Primary Examiner—Hezron Williams
Assistant Examiner—Michael Cygan
(74) Attorney, Agent, or Firm—Bose McKinney & Evans LLP

(57) ABSTRACT

A filling level measuring device operating with microwaves and to be fastened on a container (3) is provided, the device having a housing (11) and a rod-shaped antenna (7) pointing into the container (3) and the device being designed such that the antenna (7) does not transmit or receive microwaves in the region of a measuring device fastening and the transmitted power is not impaired by condensate or moisture. According to a first solution variant, the antenna (7) is fastened in the housing (11) and a section of the antenna (7) in the region of the measuring device fastening is surrounded by a metallic sleeve (8). According to a second solution variant, a sleeve (8a) in which the antenna (7) is fastened is formed onto the housing (11).

17 Claims, 3 Drawing Sheets

METHOD FOR PRODUCING FILLING LEVEL MEASURING DEVICE OPERATING WITH MICROWAVES

This is a continuation of application Ser. No. 08/926,062 filed Sep. 9, 1997 which claims benefit of Provisional No. 60/030,478 filed Nov. 13, 1996.

The invention relates to a filling level measuring device operating with microwaves and to be fastened on a container, having a housing and a rod-shaped antenna which points into the container and consists of a dielectric, in particular of polytetrafluoroethylene (PTFE) or of polyphenylenesulfide (PPS).

In filling level measurement, microwaves are sent by means of an antenna to the surface of a filled substance and the echo waves reflected at the surface are received. An echo function representing the echo amplitudes as a function of the distance is formed and used to determine the probable useful echo and its delay time. The delay time is used to determine the distance between the surface of the filled substance and the antenna.

All known methods which make it possible to measure relatively short distances by means of reflected microwaves can be used. The most well known examples are pulsed radar and frequency-modulation continuous-wave radar (FMCW radar).

In the case of pulsed radar, short microwave transmission pulses, referred to in the following as wave packets, are transmitted periodically, reflected by the surface of the filled substance and received again after a distance-dependent delay time. The received signal amplitude as a function of time represents the echo function. Each value of this echo function corresponds to the amplitude of an echo reflected at a particular distance from the antenna.

In the case of the FMCW method, a continuous microwave which is periodically frequency-modulated linearly, for example on the basis of a sawtooth function, is transmitted. The frequency of the received echo signal therefore has with respect to the instantaneous frequency which the transmitted signal has at the instant of reception a frequency difference which depends on the delay time of the echo signal. The frequency difference between transmitted signal and received signal, which can be obtained by mixing the two signals and evaluation of the Fourier spectrum of the mixed signal, consequently corresponds to the distance of the reflecting surface from the antenna. Furthermore, the amplitudes of the spectral lines of the frequency spectrum obtained by Fourier transformation correspond to the echo amplitudes. Therefore, in this case, this Fourier spectrum represents the echo function.

Filling level measuring devices operating with microwaves are used in very many branches of industry, for example in chemistry or in the food industry. Typically, the filling level in a container is to be measured. These containers usually have an opening, at which a connection piece or a flange is provided for the fastening of measuring devices.

Rod-shaped antennas, frequently also referred to as a rod antenna or dielectric rod radiator, are always used with preference if the container opening has a small diameter. Rod antennas have a small external diameter in comparison with horn radiators.

In DE-A 44 05 855 there is described a filling level measuring device operating with microwaves and to be fastened on a container, having a housing and having a rod-shaped antenna which is fastened in the housing, points into the container and consists of a dielectric.

In DE-A 44 43 055 there is described a filling level measuring device operating with microwaves, in which metallic elements are arranged at a distance from one another on a rod-shaped antenna made of a dielectric. These elements are connected electrically conductively to one another. These metallic elements serve on the one hand for focusing the microwaves, and on the other hand for preventing static charging of the dielectric rod antenna.

A disadvantage of the abovementioned filling level measuring devices operating with microwaves is that a rod antenna both transmits microwave radiation substantially forward, as a main lobe into the interior space of the container and, on account of its directional characteristic, radiates it perpendicularly with respect to the antenna axis in the form of minor lobes. Typically, the amplitude of a first minor lobe is only 20 dB to 25 dB below the amplitude of the main lobe. Although the focusing by means of metallic elements described in DE-A 44 43 055 brings about an improvement here, it is not suitable for preventing radial radiation.

The radially transmitted component of the microwave radiation is reflected, at least partially, at the rim of the opening of the container and at the measuring device fastening, and therefore constitutes spurious radiation, which may impair the measurement considerably. This spurious radiation occurs even if the height of the measuring device fastening is very low, for example only a few centimeters. The spurious radiation component depends on the method of installing the measuring device and is particularly great, for example, in the case of measuring devices fastened on tubular connection pieces.

This spurious radiation is produced, for example, by a component of the transmitted microwave energy being reflected directly at the connection piece and subsequently received by the antenna, or going into the container, or by multiple reflections occurring in the connection piece. These reflections or multiple reflections cause an artificial lengthening of short microwave pulses to be transmitted. Filling level measurement by the pulsed radar method can only be carried out, however, if the delay time of the measuring signal is greater than the duration of the transmission pulse and the time in which the spurious signals just mentioned have decayed. For the FMCW method, it applies analogously that the frequency shift of the measuring signal must be greater than the frequency shift of the spurious signals.

The smaller the distance between the measuring device fastening, for example connection piece, and the antenna, the greater the effects are for the propagation of the microwaves in the near field of the antenna.

Apart from the microwave radiation used for the filling level measurement, which is transmitted directly from the antenna to the filled substance and is reflected there directly to the antenna, spurious radiation, which has been diverted by at least one reflection at the measuring device fastening, also reaches the antenna. This causes an erroneous determination of the delay time, and consequently erroneous measurement results.

A further disadvantage of the abovementioned filling level measuring devices is that condensate or moisture, for example, can cause a direct electrical connection to develop between the antenna and the container fastening. Such a short-circuit, just like the short-circuiting of a coaxial line, causes a reflection of the entire microwave energy to the transmitter and prevents the transmission of microwaves.

Even if such a short-circuit does not occur, condensate and/or moisture have very disadvantageous effects, since they have a direct influence on the propagation and reflection behavior of microwaves. For example, spurious radiation which occurred only to a small extent directly after the installation of the device may increase so much due to condensate and/or moisture that filling level measurement is no longer possible. This is particularly disadvantageous, since the operator of the device assumes that he has a measuring device which operates reliably.

It is therefore an object of the invention to specify a filling level measuring device operating with microwaves in which the antenna does not transmit any microwaves in the region of the measuring device fastening and in which it does not receive any microwaves reflected in the region of the measuring device fastening.

Furthermore, it is an object of the invention to specify a measuring device in which the transmitted power is unimpaired by condensate or moisture.

For this purpose, according to a first solution variant, the invention comprises a filling level measuring device operating with microwaves and to be fastened onto a container, having
 a housing and
 a rod-shaped antenna which is fastened in the housing,
  points into the container and
  consists of a dielectric, in particular of polytetrafluoroethylene (PTFE) or of polyphenylenesulfide (PPS),
 in which a section of the antenna adjoining the housing is enclosed by a metallic sleeve.

According to a second solution variant, the invention comprises a filling level measuring device operating with microwaves and to be fastened onto a container, having
 a housing,
 a sleeve formed onto the housing and
 a rod-shaped antenna which is fastened in the sleeve,
  points into the container and
  consists of a dielectric, in particular of polytetrafluoroethylene (PTFE) or of polyphenylenesulfide (PPS).

According to a development of the first solution variant, microwaves are fed via a coaxial line to an exciter element introduced into the housing.

According to a refinement of the invention of one of the solution variants, the antenna has a solid cylinder, enclosed by the metallic sleeve, and a transmitting rod formed onto said cylinder and directed into the interior space of the container.

According to a further refinement of one of the solution variants, the sleeve is a tube, of which the end directed into the interior space of the container is beveled.

According to a further refinement of the invention, the sleeve is surrounded by a protective sleeve, in particular made of polytetrafluoroethylene (PTFE).

According to a further refinement of the first solution variant, the housing section in which the antenna is fastened is a circular waveguide short-circuited on one side and the sleeve is an extension of the short-circuited circular waveguide and is at the same electric potential as the section of the housing in which the antenna is fastened.

According to a further refinement of the first solution variant, the internal diameter of the sleeve is greater than the internal diameter of the section of the housing in which the antenna is fastened.

According to a further refinement of the invention, a flange, in particular made of polytetrafluoroethylene (PTFE), is formed onto the protective sleeve in a region adjoining the housing.

According to a further refinement of the first solution variant, the transmitting rod is screwed to the solid cylinder by means of a thread, the solid cylinder is screwed by means of a thread to the section of the antenna fastened in the housing and the antenna is inserted into or screwed into the housing.

According to a development of the second solution variant, microwaves are fed via a coaxial line, led through the sleeve, to an exciter element arranged in a section of the sleeve facing the antenna, in particular a transmitting wire arranged on a basic body.

Furthermore, the invention comprises a method for producing a filling level measuring device in which a section of the antenna to be arranged in the sleeve is introduced into the sleeve in the cooled state, and a method for producing a filling level measuring device into which the protective sleeve is pushed over the sleeve in the heated state.

One advantage of the invention is that microwave radiation impinging on the antenna is fully eliminated from the region of the measuring device fastening by the sleeve. The microwave radiation to be transmitted is conducted into the container in the interior of the sleeve. Thus no microwave radiation is transmitted and also none received in the region of the measuring device fastening.

One advantage of the invention is that the transmitted power of the filling level measuring device is not influenced by moisture or condensate. An electrically conductive connection between the sleeve and the measuring device fastening has no effects.

In the case of a filling level measuring device according to the first solution variant, the sleeve assumes the function of an outer conductor and shields the interior space. The metallic sleeve acts for microwaves like a mirror. Typically, containers are grounded. Both the sleeve and the measuring device fastening are preferably at a ground potential.

What was said above likewise applies to a filling level measuring device according to the second solution variant. Here, however, only to a section of the sleeve which is located on the side of the exciter element facing the container. In a section of the sleeve arranged on the side of the exciter element facing away from the container, the electrical shielding is performed by the coaxial line running in it, which is mechanically protected by the sleeve.

The invention and further advantages are now explained in more detail with reference to the figures of the drawing, in which two exemplary embodiments of a filling level measuring device operating with microwaves according to the first solution variant are represented and an exemplary embodiment of a filling level measuring device operating with microwaves according to the second solution variant is represented; identical parts are provided in the figures with identical reference numbers.

Figure 1:
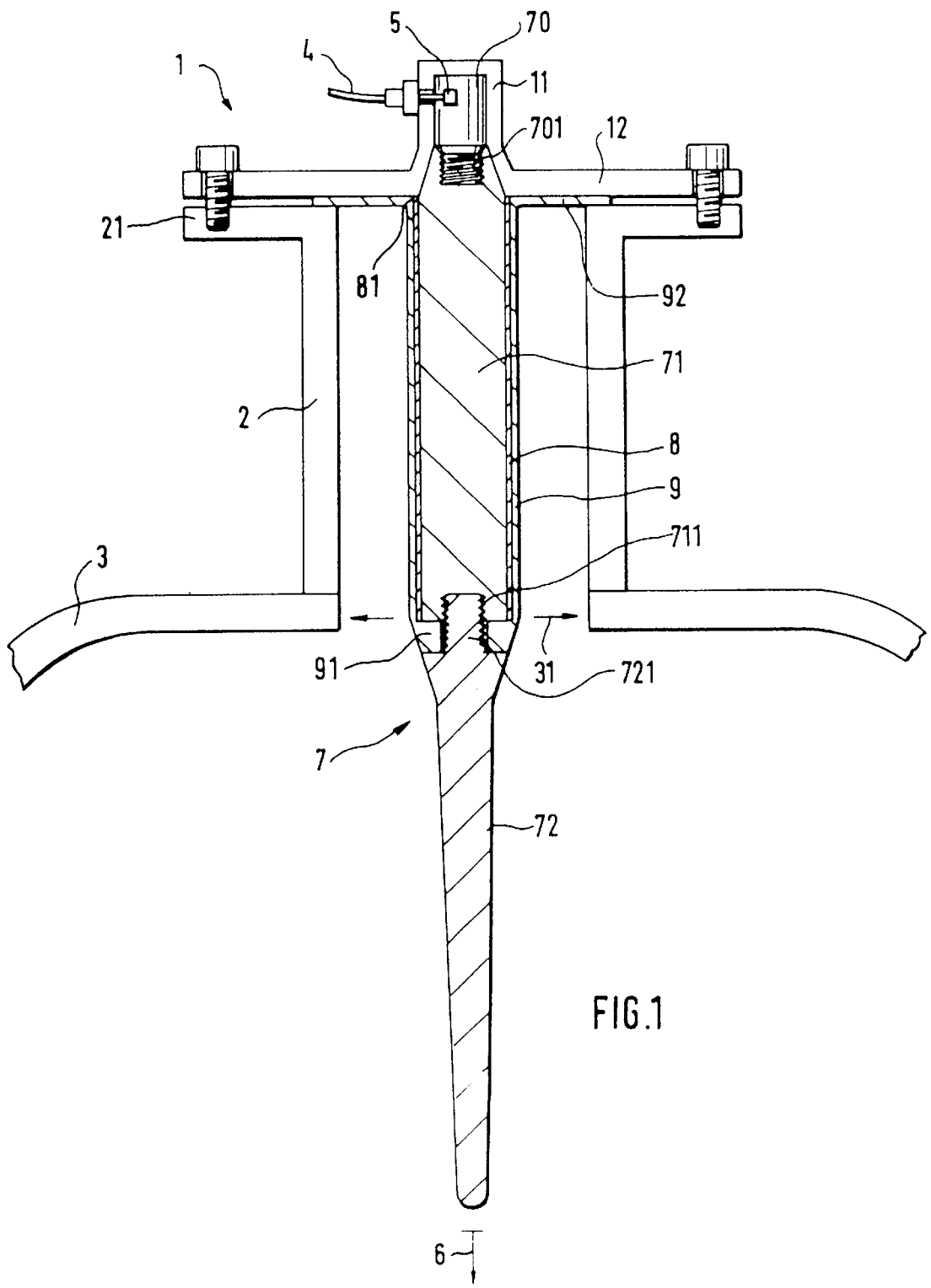
FIG. 1 shows a longitudinal section through a filling level measuring device operating with microwaves according to the first solution variant.

In FIG. 1, a filling level measuring device 1 operating with microwaves according to the first solution variant is diagrammatically represented. Serving as a measuring device fastening is a connection piece 2, on which the filling level measuring device 1 is fastened. The connection piece 2 is tubular and is mounted on, for is example welded onto, a circular opening 31 of a container 3. In the container 3 there is a medium.

The filling level measuring device 1 serves the purpose of determining the filling level of this medium in the container. It has a housing 11, which has the shape of a pot or of a tube closed off on one side at the end. Formed onto this housing 11, while leaving the pot or tube opening free, is a flange 12. The connection piece 2 has on its side facing away from the container a corresponding counter flange 21. Flange 12 and counter flange 21 are connected to each other by means of screws in such a way that the pot or tube opening is facing the opening 31 of the container 3 and the axes of symmetry of housing 11 and connection piece 2 are identical.

The microwaves are generated by a microwave generator (not represented) and are fed via a coaxial line 4 to an exciter element 5, introduced laterally into the housing 11.

The microwave generator is, for example, a pulsed-radar device, an FMCW device or a continuously oscillating microwave oscillator.

The housing 11 consists of an electrically conductive material, for example aluminum, high-grade steel or plastic coated with a conductive material, and has a circular cross section. Consequently, in terms of its geometry, it is a short-circuited circular waveguide, in which the microwave mode to be transmitted develops. The direction of radiation of the microwaves is indicated by an arrow 6.

In the housing 11 there is fastened a rod-shaped antenna 7 made of a dielectric. The antenna 7 completely fills the interior space of the housing 11, apart from a recess provided for receiving the exciter element 5, and extends through the opening 31 into the container 3.

The antenna is rod-shaped and has three sections, a first section 70, fastened in the housing 11, a solid cylinder 71, adjoining said first section, and a transmitting rod 72, formed onto said cylinder at the end, on the side thereof facing the container, and directed into the interior space of the container. All three sections consist of a dielectric, preferably of polytetrafluoroethylene (PTFE) or of polyphenylenesulfide (PPS). Both are materials which are easy to work and have a high chemical resistance.

Provided on the section 70 at the end is an external thread 701, onto which there is screwed the solid cylinder 71, having a corresponding opening with an internal thread. The solid cylinder 71 has at its end adjoining the transmitting rod 72 an opening with an internal thread 711. A correspondingly shaped continuation 721 of the transmitting rod 72 is screwed into this internal thread 711. It goes without saying that other types of connection of the antenna sections than those chosen and also the use of a one-part antenna are possible.

The section 70 may likewise be fastened in the housing 11 by means of a thread. In the exemplary embodiment, however, a different fastening is chosen, which is explained in a following paragraph.

The section of the housing 11 in which the antenna 7 is fastened and the antenna 7 may also have different cross-sectional geometries, compatible with the mode to be transmitted and the transmission frequency or frequencies. The geometry of a short-circuited circular waveguide and of a corresponding circular antenna cross section are advantageous in as much as, with such a geometry, modes which produce a radiation characteristic with a pronounced forward lobe can be propagated.

A section of the antenna 7 located in the connection piece 2 is surrounded by a metallic sleeve 8. The sleeve 8 consists, for example, of high-grade steel and bears directly against the antenna 7. In the exemplary embodiment of FIG. 1, the sleeve 8 is tubular, just like the antenna, and closely surrounds the solid cylinder 71. The close contact of the sleeve 8 bearing against the antenna is required in order that, for microwaves, there is only a single interface at which a sudden change in impedance takes place, namely that between sleeve 8 and antenna 7. Further interfaces, caused for example by trapped air bubbles, impair the quality of the sleeve 8 as an extension of the waveguide.

This close contact of the sleeve 8 is achieved by cooling that section of the antenna 7 which is to be arranged in the sleeve 8, here the solid cylinder 71, before it is introduced into the sleeve 8. The solid cylinder 71 shrunk by cooling is introduced into the sleeve 8 and expands again during the subsequent heating. Since polytetrafluoroethylene (PTFE) is a material capable of flowing to a limited extent, the solid cylinder 71 adapts itself to the internal geometry of the sleeve 8. Polyphenylenesulfide (PPS) is a material which has a coefficient of thermal expansion which is very similar to that of steel. Components of polyphenylenesulfide (PPS) can be produced with low production tolerances and behave with respect to temperature in very much the same way as the metallic sleeve 8.

The length of the solid cylinder 71 and of the sleeve 8 in the axial direction is preferably equal to the height of the connection piece 2. By the action of the sleeve 8 as a mirror for microwaves, consequently the entire microwave radiation which would impinge on the antenna 7 in the region of the connection piece is eliminated. Spurious signals from this region are consequently not received.

The sleeve 8 is at the same electric potential as that section of the housing 11 in which the antenna 7 is fastened. This takes place in the exemplary embodiment according to FIG. 1 by the sleeve 8 bearing directly with a washer-shaped end face 81 directly against the housing 11. The sleeve 8 is consequently an extension of the short-circuited circular waveguide formed by the housing 11.

Figure 2:
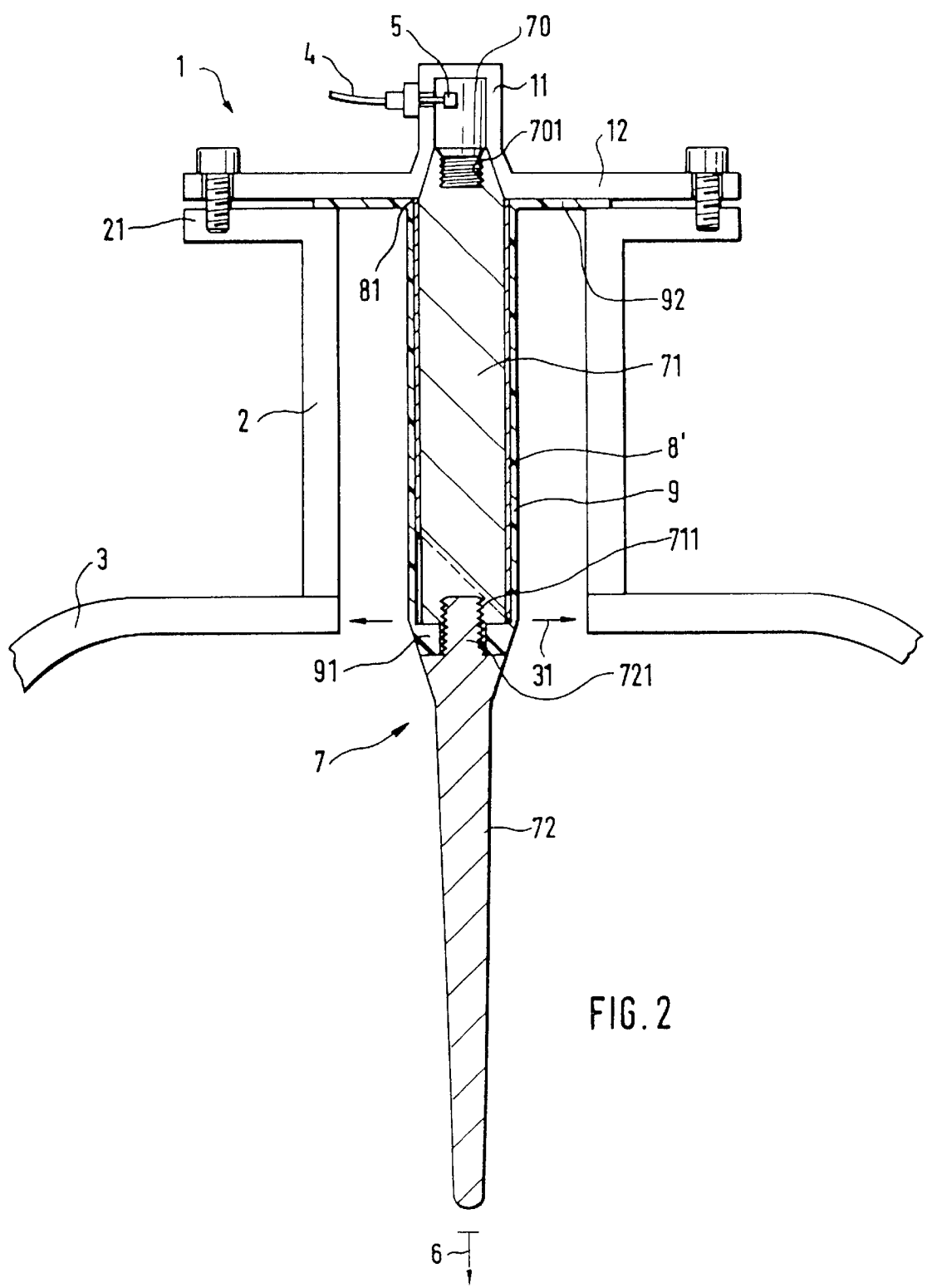
FIG. 2 shows a longitudinal section through a filling level measuring device operating with microwaves, according to the first solution variant, in which the sleeve is a tube beveled on one side at the end.

At the end of the sleeve 8 facing the transmitting rod, a sudden change in impedance occurs. To achieve a continuous transmission of the impedance, instead of the sudden change in impedance occurring with a tube cut off straight, in the case of the filling level measuring device according to the first solution variant represented in FIG. 2 a sleeve 8' is used, which has the shape of a tube beveled at its end facing the transmitting rod, i.e. cut off obliquely with respect to the perpendicular to the longitudinal axis of the tube. The line of the cut is represented in FIG. 2 by a dashed line.

A short-circuit caused by moisture or contact, for example, remains without effect on the transmitting properties of the filling level measuring device. If it is assumed that the container 3 and the housing 11 are grounded, an electrically conductive connection between the connection piece 2 and the antenna 7 would, without the sleeve 8, correspond to a short-circuit between the inner conductor of the coaxial line 4 and the outer conductor of the coaxial line 4, since the inner conductor is connected via the exciter element 5 to the antenna 7 and the outer conductor of the coaxial line 4 is connected via the exciter element 5 and the housing 11 to the connection piece 2.

Experiments have shown that it is advantageous to use a sleeve 8 with an internal diameter which is greater than the internal diameter of the section of the housing 11 in which the antenna 7 is fastened. Power loss and dispersion can be distinctly reduced as a result. These advantages are particularly pronounced in connection with the pulsed radar method. Short pulses have frequency spectra with a great bandwidth.

In the exemplary embodiments, the sleeve 8 is surrounded by a protective sleeve 9, which bears closely against a cylindrical outer lateral surface of the sleeve 8. For this purpose, in the exemplary embodiments represented in the figures, it is tubular and has at its end facing the transmitting rod a shoulder 91 extending radially into the interior of the tube. The shoulder 91 has a central through-bore with an internal thread. During its fastening on the solid cylinder 71, the continuation 721 of the transmitting rod 72 is screwed through this bore.

The protective sleeve 9 preferably likewise consists of a chemically highly resistant material, in particular of polytetrafluoroethylene (PTFE). The use of the same material for all the elements ensures that all the elements withstand the same adverse conditions. The protective sleeve 9 has no effects on the transmitting and receiving behavior of the antenna 7. It offers the advantage that simple inexpensive materials can be used for the sleeve 8, since it both protects the sleeve 8 against moisture and prevents said sleeve coming into contact with the possibly chemically aggressive or abrasive medium.

In the production of a filling level measuring device according to the invention, the protective sleeve 9 is heated. As a result, it expands and becomes slightly deformable. In this heated state, the protective sleeve 9 is pushed over the sleeve 8. During the subsequent cooling, the protective sleeve 9 shrinks onto the sleeve 8.

Formed onto the protective sleeve 9 at its end facing the housing is a washer-shaped flange 92, which runs parallel to the flange 12 of the housing 11 and is clamped between the flange 12 and the counter flange 21. Since the protective sleeve 9 is firmly connected to the antenna 7, the antenna 7 is fixed in the housing 11 by the clamping of the flange 92.

The flange 92 preferably consists of a material suitable for sealing, in particular of polytetrafluoroethylene (PTFE), with the result that the flange 92 forms a seal for the container opening.

Figure 3:
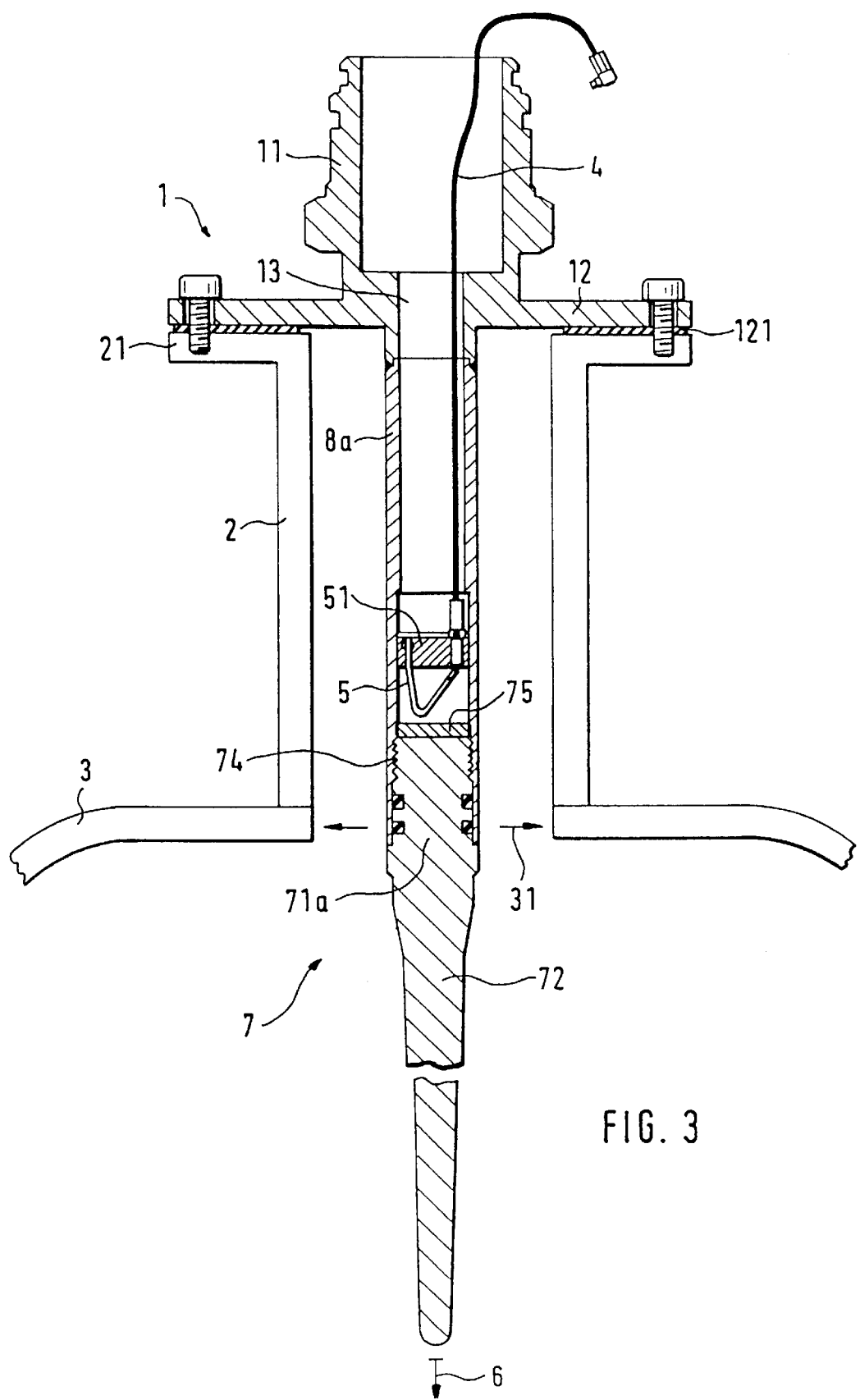
FIG. 3 shows a longitudinal section through a filling level measuring device operating with microwaves according to the second solution variant.

FIG. 3 shows a filling level measuring device operating with microwaves according to the second solution variant. It is likewise fastened on a connection piece 2 on a container 3. Just like the previously described filling level measuring devices, it has a housing 11, on which there is formed a flange 12, which is fastened on a counter flange 21, arranged on the connection piece 2. Arranged between flange 12 and counter flange 21 is a washer-shaped seal 121, for example made of polytetrafluoroethylene (PTFE).

Formed onto the housing 11 is a sleeve 8a, pointing in the direction of the container 3. In the exemplary embodiment represented in FIG. 3, the sleeve 8a is a tube made of a metal, for example of a steel or a high-grade steel, which is welded onto the housing 11. The housing 11 has a through-opening 13, which is oriented in the direction of the container 3 and the internal diameter of which in the exemplary embodiment is equal to the internal diameter of the sleeve 8a. The internal diameters may also be different.

In the sleeve 8a there is fastened a rod-shaped antenna 7. In just the same way as in the previously described exemplary embodiments, the antenna 7 has a solid cylinder 71a and a transmitting rod 72, which is formed onto said cylinder and is directed into the interior space of the container, and consists of a dielectric, in particular of polytetrafluoroethylene (PTFE) or of polyphenylenesulfide (PPS). The solid cylinder 71a is enclosed by a section of the sleeve 8a facing the container and is screwed into said section by means of an external thread 74 formed onto the solid cylinder 71a.

In a section of the sleeve 8a facing the antenna there is arranged an exciter element 5. Microwaves are fed to said element via a coaxial line 4, led through the opening 13 of the housing 11 and through the sleeve 8a.

The exciter element 5 is a transmitting wire which is arranged on a basic body 51 and is connected to an inner conductor of the coaxial line 4. For this purpose, a bushing is provided through the basic body 51. The basic body 51 is disk-shaped and consists of a metal. A section of the sleeve 8a arranged in front of the basic body 51 in the direction facing the antenna forms together with the basic body 51 a short-circuited circular waveguide, into which the microwaves are coupled by the transmitting wire 5. Arranged in front of the basic body 51 is a cylinder 75 made of a dielectric, in particular of polytetrafluoroethylene (PTFE) or of polyphenylenesulfide (PPS), which has a gap-shaped recess for receiving the transmitting wire.

The length of the sleeve 8a in the axial direction is preferably equal to the height of the measuring device fastening, in other words here equal to the height of the connection piece 2, or longer. Then, the antenna 7 cannot transmit or receive any microwaves in the region of a measuring device fastening. Nor is the transmitted power impaired by, for example, condensate or moisture between connection piece 2 and sleeve 8a.

That section of the sleeve 8a which is on the side of the exciter element 5 facing the container has the function of an outer conductor and seals the interior space. The metallic sleeve 8a acts for microwaves like a mirror. Typically, containers are grounded. Both the sleeve 8a and the measuring device fastening, here the connection piece 2, are preferably at a ground potential.

In the section of the sleeve 8a arranged on the side of the exciter element 5 facing away from the container, the electrical shielding is performed by the coaxial line 4 running in it. This is mechanically protected by the sleeve 8a.

In the case of filling level measuring devices operating with microwaves according to the second solution variant, as in the case of those according to the first solution variant, there is the possibility of obliquely designing an end of the sleeve 8a directed into the interior space of the container. Equally, the sleeve 8a may be surrounded by a protective sleeve, in particular made of polytetrafluoroethylene (PTFE). For this purpose, the geometry of the end of the solid cylinder 71a facing the container and of the end of the transmitting rod 72 facing the solid cylinder would have to be designed, for example, analogously to that of the solid cylinder 71 and of the transmitting rod 72 from FIG. 1. Here too, the protective sleeve 9 represented in FIG. 1 would have to be pushed over the sleeve 8a in the heated state. Alternatively, a protective sleeve may be pushed onto the sleeve 8a and welded at the end, for example to the transmitting rod 72 of the antenna 7. Furthermore, a flange, in particular made of polytetrafluoroethylene (PTFE), may be formed onto the protective sleeve in a region adjoining the housing 11. If such a flange has an outer annular face, clamped between the flange 12 and the counter flange 21, it is possible to dispense with the seal 121.

What is claimed is:

1. A method of producing a filling level measuring device operating with microwaves that is to be fastened onto an upper end of a connection piece that is mounted at a lower end thereof to an opening of a container, comprising the steps of:

forming a housing of the filling level measuring device such that the housing is configured to be mounted to the upper end of the connection piece;

forming an antenna of the filling level measuring device from a dielectric material;

fastening the antenna to the housing such that the antenna points into the opening of the container when the housing is mounted to the upper end of the connection piece, and forming a metallic sleeve over said antenna such that said metallic sleeve tightly encloses the antenna from the housing to the opening of the container when the housing is mounted to the upper end of the connection piece.

2. The method of claim 1, wherein the step of forming the metallic sleeve, comprises the steps of:
cooling the antenna in order to cause an exterior diameter of the antenna to shrink; and
introducing the antenna into the metallic sleeve after the step of cooling the antenna.

3. The method of claim 1, wherein the step of forming the metallic sleeve, comprises the steps of:
cooling the antenna in order to cause an exterior diameter of the antenna to shrink;
introducing the antenna into the metallic sleeve after the step of cooling the antenna; and
heating the antenna after the step of introducing in order to cause the exterior diameter of the antenna to expand and create a tight fit between the antenna and the metallic sleeve.

4. The method of claim 2, wherein the step of forming the metallic sleeve, comprises the step of:
beveling an end of the metallic sleeve that is directed into the opening of the container.

5. The method of claim 1, further comprising the step of:
forming a protective sleeve of chemical resistant material over the metallic sleeve such that the protective sleeve tightly encloses the metallic sleeve.

6. The method of claim 1, further comprising the steps of:
forming a tubular protective sleeve from chemical resistant material;
heating the tubular protective sleeve in order to cause an interior diameter of the tubular protective sleeve to increase; and
placing the tubular protective sleeve over the metallic sleeve after the step of heating the tubular protective sleeve.

7. The method of claim 1, further comprising the steps of:
forming a tubular protective sleeve from chemical resistant material;
heating the tubular protective sleeve in order to cause an interior diameter of the tubular protective sleeve to expand;
placing the tubular protective sleeve over the metallic sleeve after the step of heating the tubular protective sleeve; and
cooling the tubular protective sleeve in order to cause the interior diameter of the tubular protective sleeve to shrink and create a tight fit between the protective sleeve and the metallic sleeve.

8. A method of producing a filling level measuring device operating with microwaves that is to be fastened onto an upper end of a connection piece that is mounted at a lower end thereof to an opening of a container, comprising the steps of:
forming a housing of the filling level measuring device such that the housing is configured to be mounted to the upper end of the connection piece;
forming an antenna of the filling level measuring device from polytetrafluoroethylene;
forming an antenna to the housing such that the antenna points into the opening of the container when the housing is mounted to the upper end of the connection piece;
forming a metallic sleeve over said antenna such that said metallic sleeve tightly encloses the antenna from the housing to the opening of the container when the housing is mounted to the upper end of the connection piece; and
forming a protective sleeve of polytetrafluoroethylene over metallic sleeve such that the protective sleeve tightly encloses the metallic sleeve.

9. The method of claim 8, wherein the step of forming the metallic sleeve, comprises the steps of:
cooling the antenna in order to cause an exterior diameter of the antenna to shrink; and
introducing the antenna into the metallic sleeve after the step of cooling the antenna.

10. The method of claim 8, wherein the step of forming the metallic sleeve, comprises the steps of:
cooling the antenna in order to cause an exterior diameter of the antenna to shrink;
introducing the antenna into the metallic sleeve after the step of cooling the antenna; and
heating the antenna after the step of introducing in order to cause the exterior diameter of the antenna to expand and create a tight fit between the antenna and the metallic sleeve.

11. The method of claim 8, wherein the step of forming the metallic sleeve, comprises the step of:
beveling an end of the metallic sleeve that is directed into the opening of the container.

12. The method of claim 8, wherein the protective sleeve is a tubular protective sleeve and wherein step of forming a protective sleeve comprises the steps of:
heating the tubular protective sleeve in order to cause an interior diameter of the tubular protective sleeve to increase; and
placing the tubular protective sleeve over the metallic sleeve after the step of heating the tubular protective sleeve.

13. The method of claim 8, wherein the protective sleeve is a tubular protective sleeve and wherein step of forming a protective sleeve comprises the
heating the tubular protective sleeve in order to cause an interior diameter of the tubular protective sleeve to expand;
placing the tubular protective sleeve over the metallic sleeve after the step of heating the tubular protective sleeve; and
cooling the tubular protective sleeve in order to cause the interior diameter of the tubular protective sleeve to shrink and create a tight fit between the protective sleeve and the metallic sleeve.

14. A method of producing a filling level measuring device operating with microwaves that is to be fastened onto an upper end of a connection piece that is mounted at a lower end thereof to an opening of a container, comprising the steps of:
forming a housing of the filling level measuring device such that the housing is configured to be mounted to the upper end of the connection piece;
forming an antenna of the filling level measuring device from polyphenylenesulfide; fastening the antenna to the housing such that the antenna points into the opening of the container when the housing is mounted to the upper end of the connection piece;
cooling the antenna in order to cause an exterior diameter of the antenna to shrink;

introducing the antenna into a metallic sleeve after the step of cooling the antenna; and heating the antenna after the step of introducing in order to cause the exterior diameter of the antenna to expand and create a tight fit between the antenna and the metallic sleeve.

15. The method of claim 14, wherein the steps of forming the metallic sleeve, comprises the step of:

beveling an end of the metallic sleeve that is directed into the opening of the container.

16. The method of claim 14, further comprising the step of:

forming a tubular protective sleeve from chemical resistant material over the metallic sleeve such that the tubular protective sleeve tightly encloses the metallic sleeve; and wherein the step of forming a tubular protective sleeve comprises the steps of:

heating the tubular protective sleeve in order to cause an interior diameter of the tubular protective sleeve to increase; and placing the tubular protective sleeve over the metallic sleeve after the step of heating the tubular protective sleeve.

17. The method of claim 14, further comprising the step of:

forming a tubular protective sleeve from chemical resistant material over the metallic sleeve such that the tubular protective sleeve tightly encloses the metallic sleeve; and wherein the step of forming a tubular protective sleeve comprises the steps of:

heating the tubular protective sleeve in order to cause an interior diameter of the tubular protective sleeve to expand;

placing the tubular protective sleeve over the metallic sleeve after the step of heating the tubular protective sleeve; and cooling the tubular protective sleeve in order to cause the interior diameter of the tubular protective sleeve to shrink and create a tight fit between the protective sleeve and the metallic sleeve.

* * * * *